United States Patent [19]

Kuchyt et al.

[11] Patent Number: 4,576,543

[45] Date of Patent: Mar. 18, 1986

[54] KNOCK-DOWN CONSTRUCTION FOR FRONT END LOADER

[75] Inventors: James R. Kuchyt, Fort Erie; Paul G. High, St. Catharines, both of Canada

[73] Assignee: KMW Products Limited, St. Catharines, Canada

[21] Appl. No.: 549,065

[22] Filed: Nov. 7, 1983

[51] Int. Cl.[4] .............................................. B66F 9/00
[52] U.S. Cl. ...................................... 414/722; 414/685
[58] Field of Search ................. 414/685, 686, 722, 727

[56] References Cited

U.S. PATENT DOCUMENTS

| | | | |
|---|---|---|---|
| 1,585,313 | 5/1926 | Olson | 414/722 |
| 3,254,780 | 6/1966 | Midtbo | 414/685 |
| 3,512,665 | 5/1970 | Westendorf | 414/723 |
| 4,155,470 | 5/1979 | Moore et al. | 414/727 |
| 4,161,369 | 7/1979 | Moreno | 414/722 |
| 4,162,872 | 7/1979 | Grooss et al. | 414/727 |

Primary Examiner—Magdalen Y. C. Moy
Assistant Examiner—David A. Okonsky
Attorney, Agent, or Firm—Sim & McBurney

[57] ABSTRACT

A power loader arrangement comprises spaced-apart boom arms supported on a sub-frame assembly for connection to tractors and the like. The boom arms are connected at their forward portions by one or two cross-members to withstand the loads applied to the boom arms during use of the loader. The sub-frame assembly and the cross-member are mechanically interconnected to provide for a compact disassembled construction of a loader to facilitate manufacture and shipping thereof.

19 Claims, 14 Drawing Figures

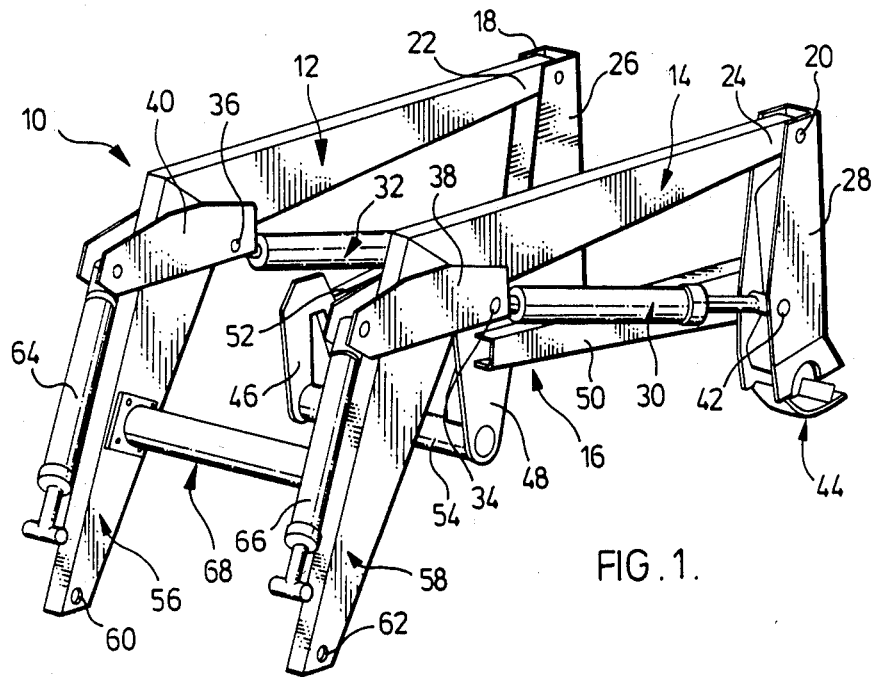
FIG. 1.
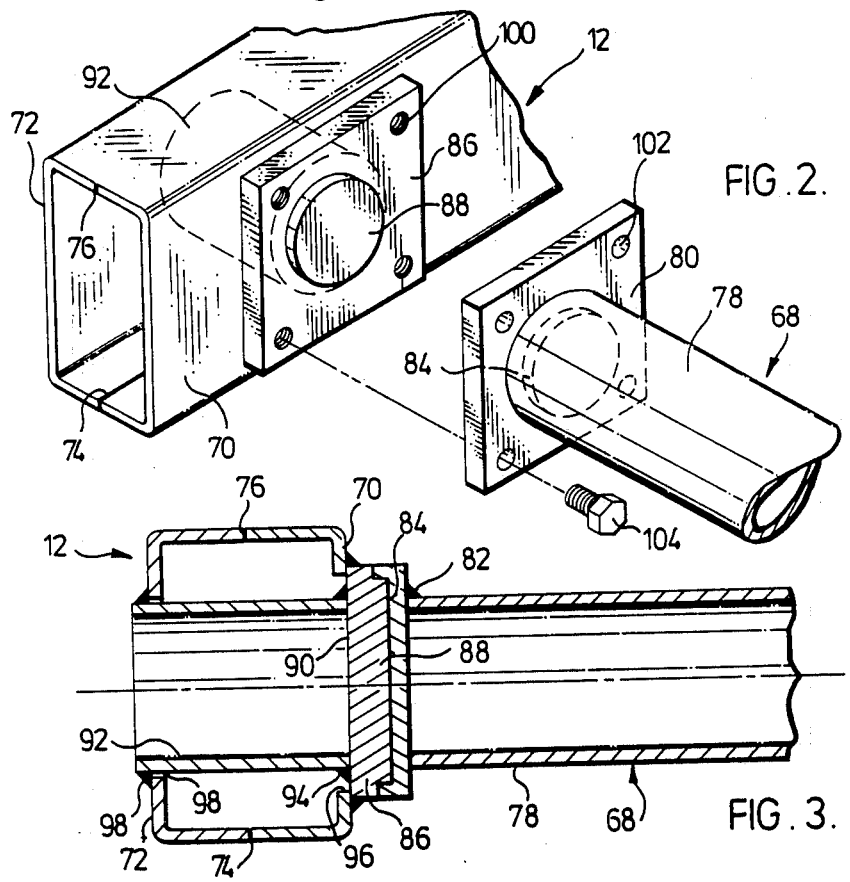
FIG. 2.
FIG. 3.

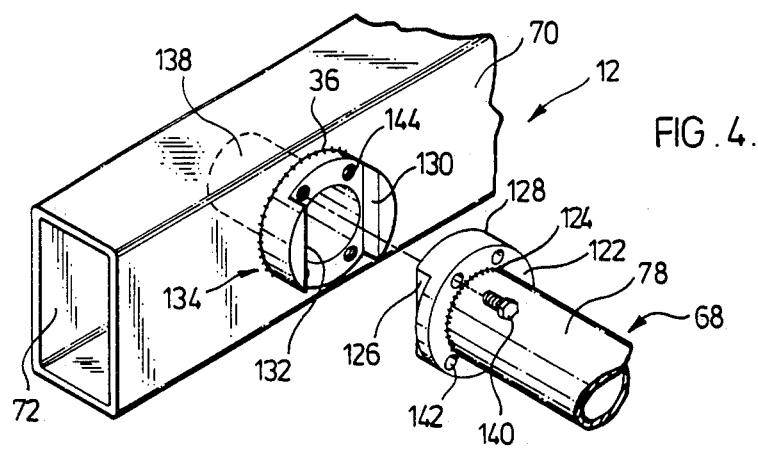
FIG. 4.
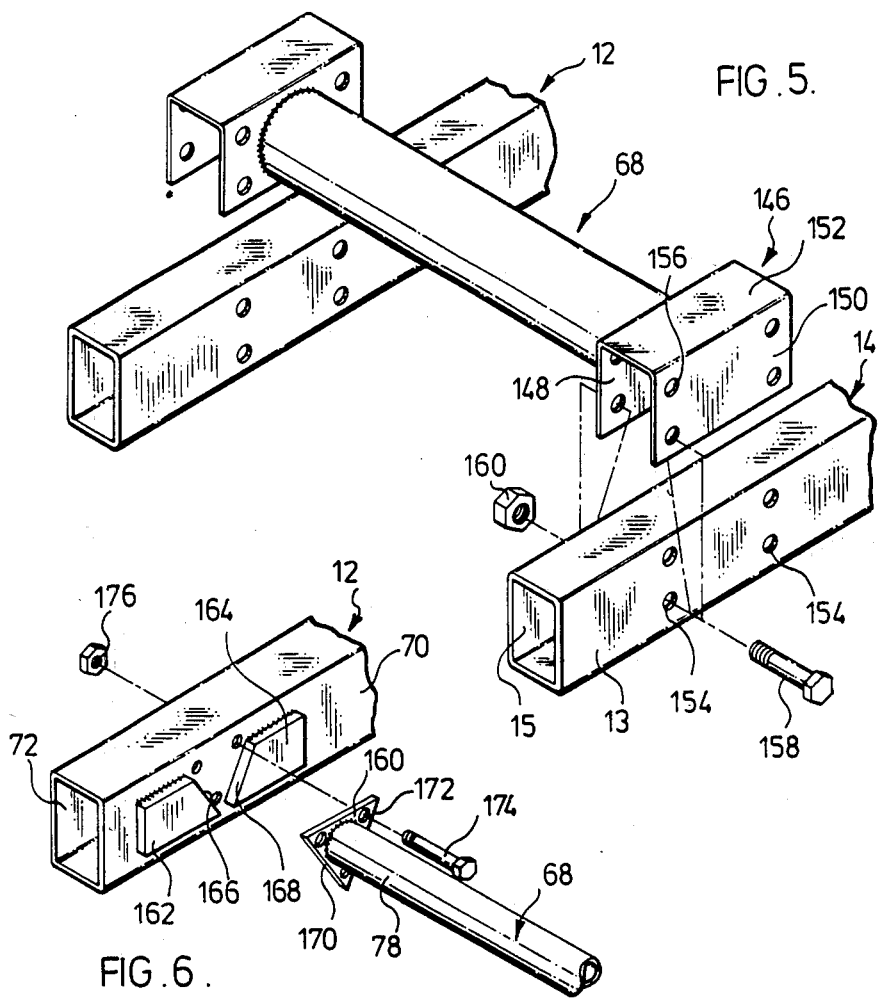
FIG. 5.
FIG. 6.

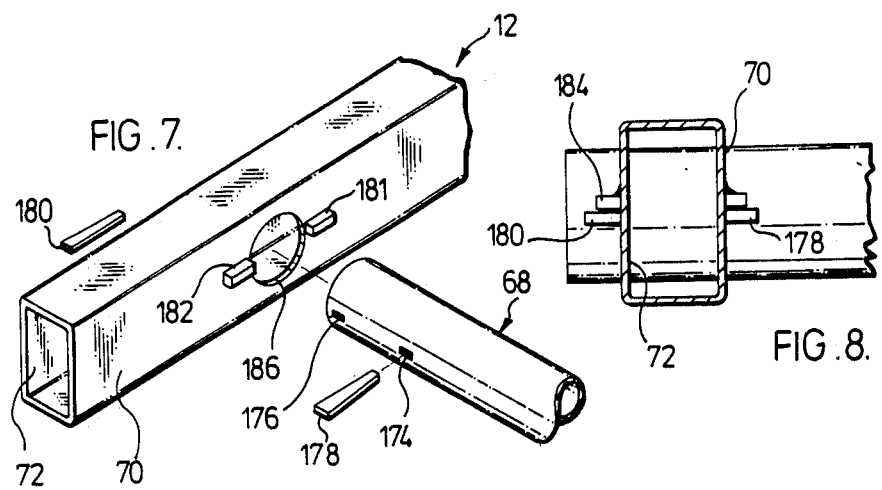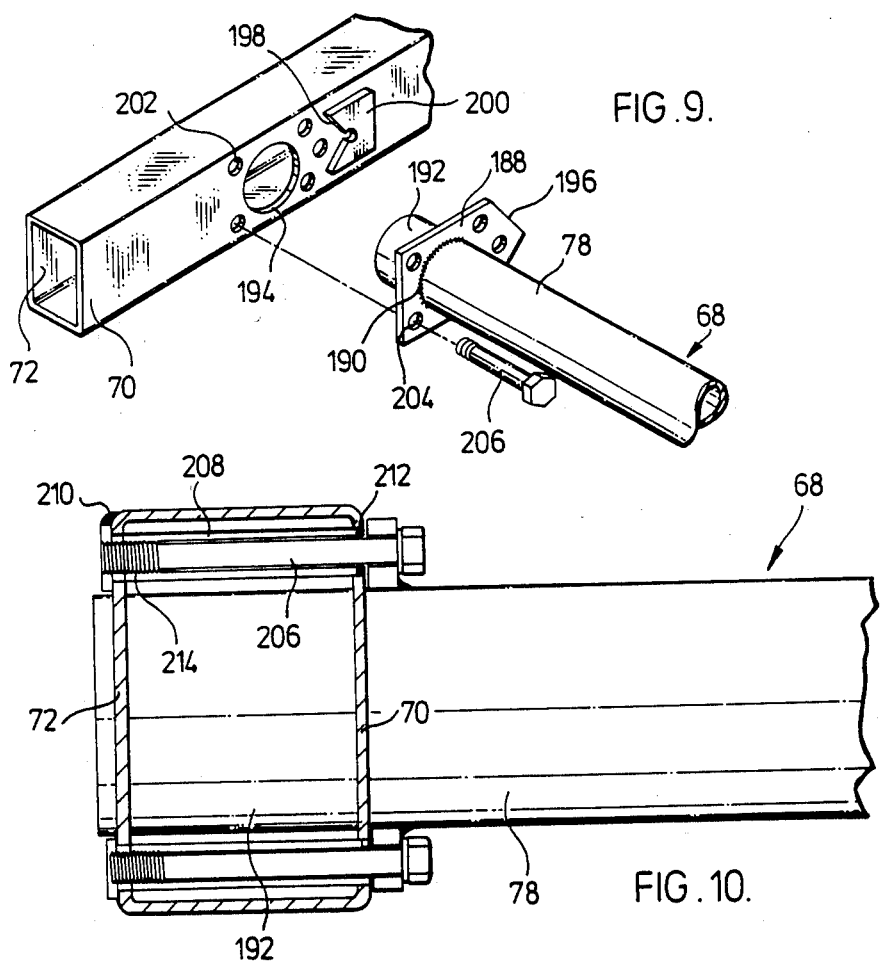

KNOCK-DOWN CONSTRUCTION FOR FRONT END LOADER

FIELD OF THE INVENTION

This invention relates to power loader arrangements and in particular power loaders which may be manufactured and shipped in a collapsed relationship and subsequently constructed on site for end use.

BACKGROUND OF THE INVENTION

Power loaders are commonly used on farm tractors and other power vehicles which have various working implements for handling gravel, manure, bales and other general items in the farm and construction sites. The power loader includes a sub-frame assembly for supporting spaced-apart loader boom members on the power vehicle. The sub-frame assembly is mounted on the vehicle where the boom members are hinged to the sub-frame assembly and hydraulic cylinders or the like are used to raise and lower the boom members and thereby control the shovel, bucket or the like at the front of the loader. Hydraulic cylinders are normally used to control the movement of the bucket.

A typical power loader is disclosed in U.S. Pat. No. 3,254,780 issued June 7, 1966. The sub-frame assembly and the loader boom arms are assembled ready for use. For purposes of shipping, this structure is extremely bulky and considerably adds to the space for shipping requirements. Another problem encountered with the boom arms being permanently secured together, is that in the manufacturing process, considerable manufacturing space is required to provide the necessary jigs to perform the welding of the pieces to the boom arms and interconnect them with the cross-members. Subsequent sandblasting and painting of the units and machining of various surfaces becomes an elaborate process.

The power loader arrangement according to this invention overcomes these problems by providing mechanical interconnection for the sub-frame assembly and the boom members to facilitate manufacture and shipping.

SUMMARY OF THE INVENTION

A power loader arrangement according to an aspect of the invention has two spaced-apart boom members. A sub-frame assembly is used to mount the boom members at their rearward portions on a tractor and at least one cross-member for interconnecting the boom members at their forward portions and maintaining a predetermined spacing therebetween. The sub-frame assembly has two side arms which are positioned alongside a tractor and mechanically interconnected at their front portions to support vertical loads when in use.

The at least one cross-member for the boom arms is mechanically interconnected thereto. Each boom member is hollow with spaced-apart inner and outer plates secured together along corresponding upper and lower edges. Means at each cross-member end portion is provided for mechanically securing the respective cross-member end portion to the respective inner and outer plates.

The securing means comprises: means associated with the boom arm and means associated with a respective end portion of the cross-member which are adapted to cooperate to resist shear and torsional forces exerted on the interconnection during usage of the loader. Means is associated with the cooperating means to provide for a transfer of a portion of the torsional and shear forces and longitudinal forces exerted along the cross-member during loader use from the inner plate to the outer plate of each boom arm. A releasable fastener means is provided for coupling the cooperating means and in conjunction with the transfer means provides a secure interconnection.

The mechanical securement of the at least one cross-members to the boom arms and the mechanical interconnection of the sub-frame provides for a compact disassembled loader arrangement.

BRIEF DESCRIPTION OF THE DRAWINGS

Preferred embodiments of the invention are shown in the drawings wherein;

FIG. 1 is a perspective view of a power loader arrangement;

FIG. 2 is an exploded perspective view of an embodiment for the mechanical interconnection of the cross-member and loader boom arm;

FIG. 3 is a section through the interconnection of FIG. 2;

FIGS. 4, 5, 6 and 7 are exploded perspective views of alternative embodiments for the mechanical interconnection of cross-member to boom arm;

FIG. 8 is a section through the interconnection of FIG. 7;

FIG. 9 is an exploded perspective view of an embodiment of the mechanical interconnection of cross-member to boom arm;

FIG. 10 is a section through the interconnection of FIG. 9;

DETAILED DESCRIPTION OF THE PREFERRED EMBODIMENTS

Figure 11:
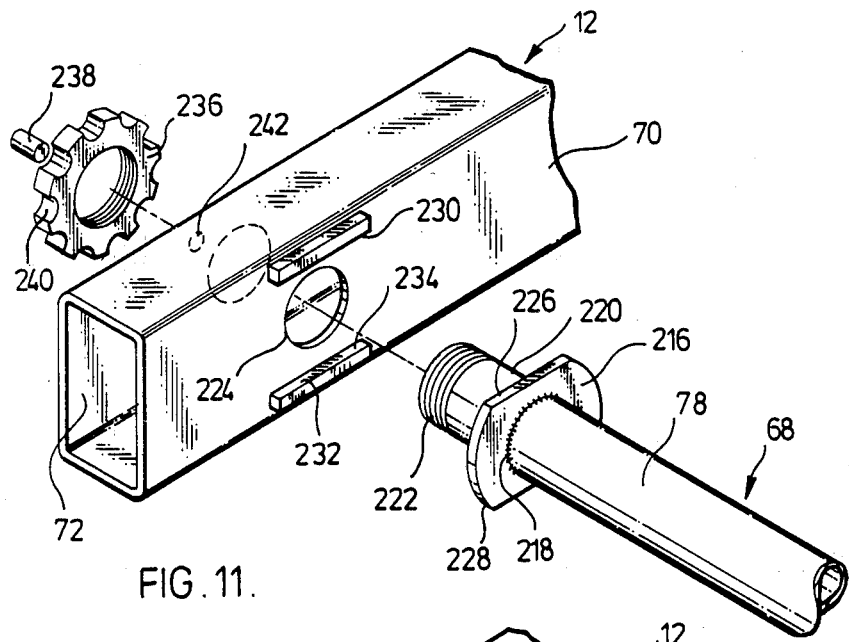
FIG. 11 is an exploded perspective view of an embodiment of a mechanical interconnection of cross-member to boom arm.

The power loader 10 as shown in FIG. 1 has spaced-apart boom members 12 and 14. A sub-frame assembly 16 is provided to support the boom arms by way of connecting at pivotal points 18 and 20 the rearward portions 22 and 24 to the upright portions 26 and 28 of the sub-frame assembly.

The boom arms 12 and 14 are raised and lowered under the control of hydraulic cylinders 30 and 32 which by extension and retraction control movement of the boom arms. The hydraulic cylinders have their cylinder portions pivotally connected to the boom arm at points 34 and 36 via the plate members 38 and 40 which are secured to the boom arms. The piston portion of each cylinder is pivotally connected at 42 to the sub-frame assembly upright portion 28. At the lower portion 28 of the sub-frame assembly a hinge connection 44 is provided. These portions are mounted on corresponding outwardly extending posts which are secured to the tractor. The hinge assemblies 44 are bolted closed about the posts on the tractor to secure the rear portion of the sub-frame assembly to the tractor.

The forward portion of the sub-frame assembly 16 includes depending plates 46 and 48 which are permanently secured by welding to the side arms 50 and 52 of the sub-frame assembly. The side arms 50 and 52 extend alongside the tractor. Mechanically interconnected to the plates 46 and 48 is a support arm 54, the detail of which mechanical interconnection is shown more clearly in FIG. 14. The support arm 54 is mounted in a corresponding bracket which is secured to the tractor to support vertical loads as applied thereto when the front end loader is used.

The boom members or arms 12 and 14 are somewhat L-shaped where their foremost portions 56 and 58 include apertures 60 and 62 to facilitate connection of a loader bucket or some other form of working implement. Hydraulic cylinders 64 and 66 are provided on the boom arms which when extended and retracted control the movement of the implement secured or pivotally connected to the foremost portions 56 and 58 of the power loader arrangement.

During use it is important that the spacing between the loader boom members 12 and 14 be maintained at all times. At least one cross-member 68 is secured between the boom members 12 and 14 to always assure the predetermined spacing. Depending upon the anticipated loads to which the loader will be subjected, there may be two cross-members.

Figure 14:
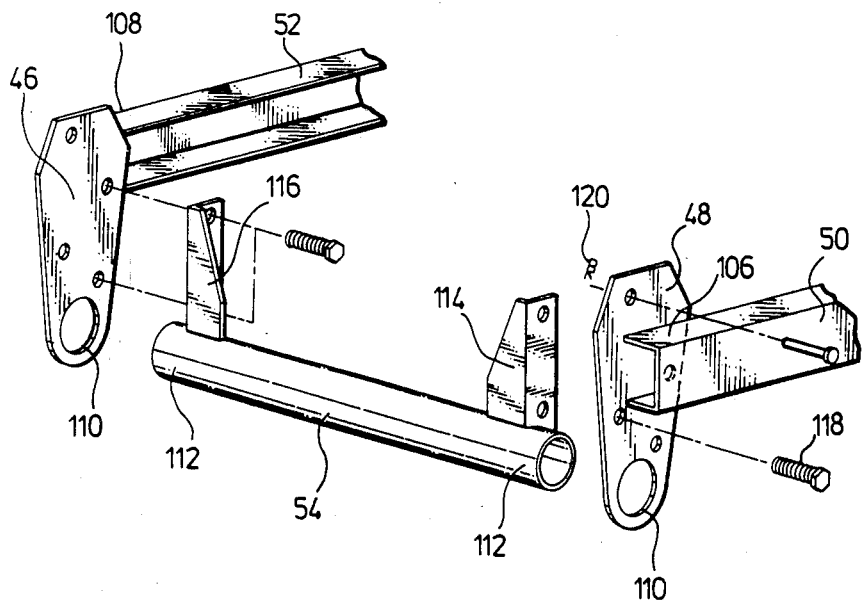
FIG. 14 is an exploded view of the sub-frame mechanical interconnection.

It has been discovered that a mechanical interconnection of the cross-member 68 to the boom arm provides not only significant advantages from a shipping standpoint but also from a manufacturing standpoint. Thus the mechanical interconnection of the cross-member 68 and of the sub-frame assembly, in a manner to be discussed with respect to FIG. 14, provides many advantages which will become apparent in a further discussion of various mechanical interconnections for the cross-member to the boom arms.

FIG. 2 demonstrates a preferred mechanical interconnection for the cross-member 68 to a corresponding boom arm. The boom 12 consists of an inner plate portion 70 and an outer plate portion 72. According to this preferred embodiment, the plate portions consist of J-shaped channels the legs of which are interconnected by welding at seams 74 and 76 along the upper and lower portions of the boom arm 12.

An end portion 78 of the boom arm 68 has secured thereto a metal plate or pad 80 which is connected by way of bead weld 82 as shown in FIG. 3. The metal pad 80 is rectangular in shape and has formed on its inner face a circular recess 84 which is shown more clearly in FIG. 3. Secured to the inner plate 70 of the boom arm 12 is a second metal plate or pad 86 which has projecting from its face a cylindrical projection 88. The faces of the metal pads 80 and 86 are machined with the recess 84 snugly receiving the projection 88 to provide a mating interfit as shown in FIG. 3 when the pads 80 and 86 are coupled.

The metal pad 86 has secured to its inner face 90 a tubular extension 92 which is of the same material as the cross-member 68. Extension 92 is secured to metal pad 86 by bead weld 94. The tubular blank 92 extends through the apertures 96 and 98 of the inner and outer plates where the outer portion of the tube 92 is secured to the outer plate 72 by bead weld 98.

Metal pad 86 has formed therein four threaded bores 100 symmetrically located about the cylindrical projection 88. Four corresponding apertures 102 are formed in plate 80 which are in register with the threaded bores 100 when the cylindrical projection 88 is received in recess 84. Bolts 104 are provided as the fasteners for coupling the metal plates 80 and 86 and thereby complete the mechanical interconnection of the cross-member to the boom arm.

It can be appreciated that when the loader is used, the arms are subjected to considerable forces particularly when the working implement is rammed into various objects. The cross-member serves to retain the integrity of the loader unit during use and is subjected to torsional, shear forces at its interconnection to the boom arms and to tension and compression forces along the cross-member. The coupling of the pads 80 and 86 with the fasteners 104 resist these forces during use of the power loader. To enhance the strength of the interconnection and the distribution of the forces between the boom arms, the mechanical connection is adapted to transfer at least a portion of these forces to the outer plate of each boom arm 12 and 14. As shown in FIG. 3, the tubular extension 92 as secured to the pad 86 and to the outer plate 72 of boom arm 12 transfers a portion of these forces to the outer plate.

As shown in FIG. 14, the mechanical interconnection for the sub-frame is shown in more detail. The side members 50 and 52 have welded to their end portions 106 and 108 the depending plates 46 and 48. Each plate has an aperture 110 provided therein to receive the tubular support member 54. The apertures 110 are of sufficient size to snugly receive the end portions 112 of the support member 54. To mechanically interconnect the support member 54 to the depending plates 46 and 48, upstanding brackets 114 and 116 are secured to the tube ends 112 and are located inwardly of the end portions to allow the tubular support member 54 to extend through each aperture 110. Bolts 118 are provided for securing the support member 54 to the depending plates, thereby completing the mechanical interconnection of the sub-frame assembly. Since the support member 54 only has to support vertical loads, clips 120 may be used to secure the bolt fasteners 118 in place, the vertical load being carried by the interfit of the tubular end portions 112 with the apertures 110. As is appreciated by those skilled in the art, tubular support 54 is received by a U-shaped bracket at the front portion of the tractor to support the vertical loads by the tractor frame.

Alternative connections are shown in FIGS. 4 through 7, all of which differ in structure yet accomplish the above features in handling the excessive forces exerted on the mechanical interconnections of the cross-member to the boom arms. As shown in FIG. 4, a similar interconnection to that of FIG. 2 is provided on cross-member 68. A machined part 122 is provided which is secured to the tube end 78 by bead weld 124. The machine part 122 has two planar portions 126 and 128 which interfit with and abut planar surfaces 130 and 132 of machined part 134 which is secured to the inner plate 70 by bead weld 136. A tubular extension 138 is secured to part 134 and to the outer plate 72 in a manner similar to that discussed with respect to FIG. 2. Bolt fasteners 140 extend through the apertures 142 in part 122 and are threaded into the threaded bores 144 of part 134. When the bolts are tightened, the mechanical interconnection is complete where the faces interlock to resist torsion and shear forces and by way of the fasteners resist the tension and compression forces along the cross-member 68 and via extension 138 are distributed over both the inner and outer plates 70 and 72.

A form of saddle-type mechanical interconnection is shown in FIG. 5. Each end of the cross-member 68 includes a U-shaped bracket 146 for use in mechanically interconnecting the cross-member 68 to the boom members 12 and 14. The U-shaped bracket 146 includes inner and outer plate portions 148 and 150, interconnected by the base portion 152 of the inverted U-shaped member. The boom arm 14 includes aligned apertures 154 which extend through the inner and outer plates 13 and 15 of the boom arm 14. Corresponding apertures 156 are provided in the U-shaped bracket 146 so as to be in register with the apertures 154 when the cross-member 68 is located on the boom arms 12 and 14. Bolts 158 and nuts 160 are used to couple the U-shaped bracket 146 to the boom arm outer and inner plates 13 and 15 to complete the connection and thereby resist the forces exerted on the connections during use.

In FIG. 6 an alternative arrangement is disclosed for resisting the torsion and shear forces. The cross-member 68 has secured to its end 78 a triangular plate portion 160 which abuts the inner plate 70 of boom arm 12. Lug portions 162 and 164 are secured to the inner plate 70 to provide planar surfaces 166 and 168 which mainly engage and contact corresponding planar surfaces 170 and 172 of triangular plate 160. Nut and bolt fasteners 174 and 176 are used to couple the interconnection where forces are transferred to the outer plate 72 via the bolt portions 174 which may have a special adaptation of the type shown in FIG. 10.

FIG. 7 discloses the use of a wedge arrangement to secure the mechanical interconnection of the cross-member 68 to the boom arm 12. The cross-member 68 has provided therein two pairs of slots 174 and 176 which receive the narrower portions of wedges 178 and 180. Secured to the inner and outer plates 70 and 72 are lug portions 180 and 182, and similar portions 184 on both sides of the apertures 186 in the inner and outer plates 70 and 72. The lug on the far side of the aperture in the outer plate is not shown in FIG. 8. The wedges 178 and 180 are driven into the aligned pairs of slots 174 and 176 to complete the connection.

The wedge fasteners as driven into place secure the cross-member 68 to the boom arms 12 and 14 to resist the tension and compression forces and resist the torsion forces by the wedges 178 and 180 abutting the lugs 181 and 182. The shear forces are resisted by the apertures 186 in the inner and outer plates snugly receiving the tubular cross-member 68 to form a secure interconnection.

An adaptation of the angular plate approach to securing the cross-member to the boom arms to resist torsional forces is disclosed in FIG. 9. The cross-member 68 has secured over its end portion 78 a plate member 188 which is five-sided and is secured to the cross-member by bead weld 190. The cross-member 68 has an extension 192 which extends through apertures 194 in the inner and outer plates 70 and 72. The aperture sizing 194 is such to snugly receive the extension 192 to resist shear forces at the interconnection. The plate portion 180 includes an apex 196 which is received in recess 198 of lug 200 which is secured to plate 70. The plate 70 includes apertures 202 which are aligned and in registration with apertures 204 in plate 188. Bolt fasteners 206 are used to couple the plate 188 to the lug 200 to form an intermating fit and resist torsional forces exerted on the interconnection. In transferring these forces to the outer plate 72 of the connection as shown in FIG. 10, sleeves 208 are provided which are welded to the outer plate by weld portions 210 and to the inner plate by welds 212. The bolt fastener 206 is threaded into threaded bore 214 of each sleeve 208 to complete the interconnection and via the sleeve transmit at least a portion of the forces to the outer plate 72.

A threaded interconnection for the cross-member 68 to the boom arm 12 is shown in FIG. 11. The cross-member 68 has a plate or metal pad 216 secured to its end portion 78 by way of bead weld 218. Its extended portion 220 has an externally threaded end 222. The extension 220 extends through apertures 224 in the inner and outer plates 70 and 72. The pad 216 includes planar portions 226 and 228 which contact and matingly interfit with corresponding surfaces 230 and 232 of the lugs 234 which are secured to the plate 70. A nut 236 is threaded onto thread 222 to complete the interconnection. A pin 238 is used to secure the nut by registering an arcuate groove 240 with the pin aperture 242. The secured interconnection thereby resists the forces as applied to the interconnection during use.

Figure 12:
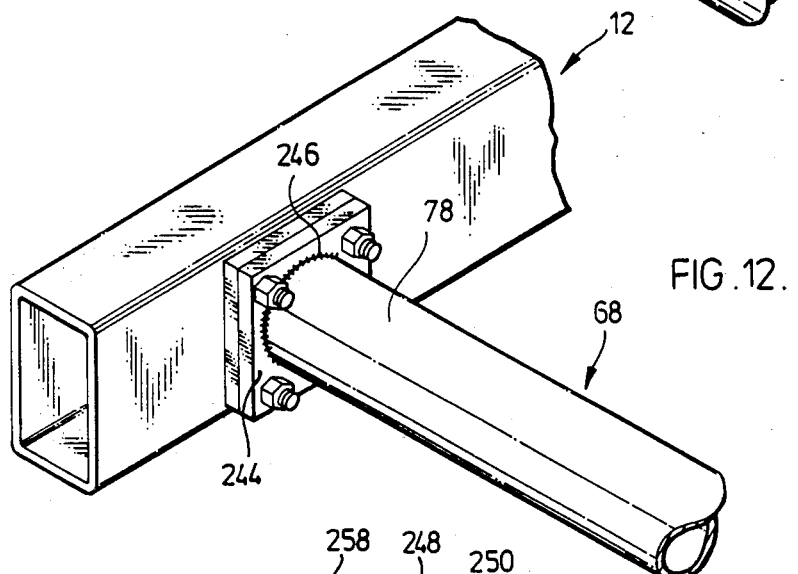
FIG. 12 is a perspective view of an embodiment for the assembled mechanical interconnection of cross-member to boom arm.
Figure 13:
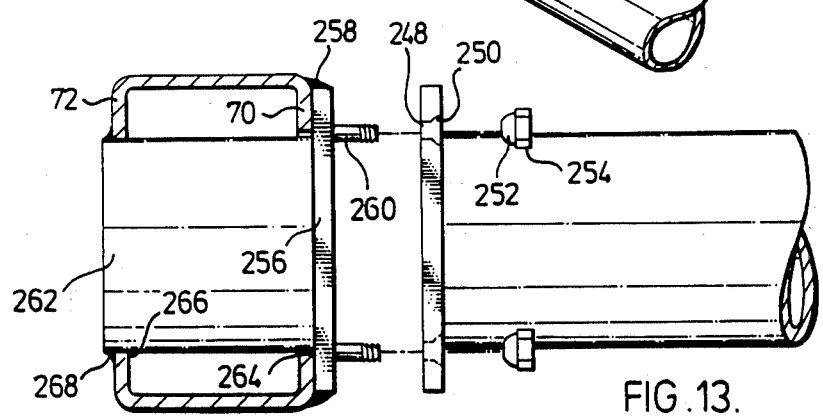
FIG. 13 is an exploded side elevation of the interconnection of FIG. 12.

As shown in FIG. 12, another adaptation of a plate-like interconnection of the cross-member 68 to the boom arm 12 is shown. The end portion 78 has secured thereto a rectangular plate 244 by way of a bead weld 246. The plate 244 has apertures 248 as shown in FIG. 13 which are counter-bored at 250 to receive the corresponding tapered portions 252 of nuts 254.

A second rectangular plate 256 is secured by bead weld 258 to the inner plate 70 of the boom arm. Secured in plate 256 are studs 260 which are in registration with the apertures 248. Tubular member 262 is secured to plate 256 and extends through apertures 264 and 266 in the inner and outer plates 70 and 72. The outer portion of tube 262 is secured to the outer plate 72 by bead weld 268, to function in a manner similar to that discussed with respect to FIG. 3. When the nuts 254 are secured on the studs 260, a centering of the plates takes place due to the interfit of the tapered portions 252 of the nuts in the counter-bores 250 of the plate. This completes the coupling of the interconnection whereby the forces on the interconnection are resisted and a portion of which are transferred to the outer plate 72.

It is apparent that by way of discussion of the several preferred embodiments for the mechanical interconnections of the sub-frame assembly and the cross-members for the boom arms, a secure arrangement is provided which resists all of the forces exerted on the connection during use, yet provide an arrangement which may be shipped in a disassembled form and readily assembled in the field. By shipping the power loader in a disassembled arrangement, approximately half of the shipping space and crating size is required. Another significant advantage of the mechanical interconnection assembly is during manufacture where the parts may be individually handled for welding, sandblasting and painting. A further advantage is in the replacement aspect that should one of the components become damaged such as a boom arm, then only that boom arm need be replaced rather than scrapping the entire system.

While preferred embodiments of the invention have been described and illustrated herein, the person skilled in the art will appreciate that changes and modifications may be made thereto without departing from the spirit and scope of this invention as defined in the appended claims.

The embodiments of the invention in which an exclusive property or privilege is claimed are defined as follows:

1. In a power loader arrangement having two spaced-apart boom members, a sub-frame assembly for mounting said boom members at their rearward portions on a power vehicle and at least one cross-member for mechanically interconnecting said boom members at their forward portions and maintaining a predetermined spacing therebetween, said sub-frame assembly including two side arms for positioning alongside a power vehicle and mechanically interconnected at their front portions to support vertical loads when in use, each boom member being hollow and having spaced-apart inner and outer plates secured together along corresponding upper and lower edges, means at each cross-member end portion for mechanically securing the respective cross-member end portions to the respective inner and outer plates, said securing means comprising:
means associated with said inner plate of said boom arm and means associated with a respective end portion of said cross-member which are adapted to cooperate to resist shear and torsional forces exerted on said interconnection during usage of said loader,
means associated with said respective cooperating means of said boom arm and cross member end portion to provide for a transfer of a portion of said torsional and shear forces and longitudinal forces exerted along said cross-member during loader use from said inner plate to said outer plate of each boom arm and
mechanically releasable fastener means at both end portions of said cross member for coupling said respective cooperating means and in conjunction with said
transfer means providing a secure interconnection, said mechanical securement of the at least one cross-member to said boom arms and the mechanical interconnection of the sub-frame providing for a compact disassembled loader arrangement.

2. In a power loader of claim 1, said cooperating means having mutual mating faces which are machine finished to provide a secure coupling to resist torsional and shear forces.

3. In a power loader of claim 1, said releasable fastener means comprises a plurality of nuts and bolts, the bolts extending through aligned apertures in said cooperating means and said inner and outer plates to secure the interconnection with the corresponding nuts.

4. In a power loader of claim 1, said means associated with said boom arm is permanently secured to said inner plate, said means associated with said cross-member end portions being secured to said means on the inner plate by said fastener means, said transfer means being permanently secured to said means on the inner plate and extending through the hollow boom arm and being permanently secured to said outer plate.

5. In a power loader of claim 1, said transfer means comprising a plurality of aligned apertures extending through said means associated with said cross-member end portions and said inner and outer plates to receive said fastener means by which a portion of said forces are transferred to said outer plate.

6. In a power loader of claim 1, said sub-frame comprising a support arm mechanically connected at each end to said side arms, each side arm having an aperture through which each end portion of said support arm extends.

7. In a power loader of claim 1, said means associated with said cross-member end portions comprises an inverted U-shaped bracket, a first leg of said bracket contacting said inner plate of the boom member, said second leg of said bracket contacting said outer plate and said bracket central portion contacting said upper portion of the boom member, said means associated with said boom member comprising a plurality of aligned apertures in said inner and outer plates, said fastener means coupling said means to resist said forces.

8. In a power loader of claim 1, said means associated with said cross-member end portions comprising two aligned pairs of slots extending through said cross-member and located to each side of said inner and outer plates with said cross-member extending through said boom arm via aligned openings in said inner and outer plates, said openings snugly receiving said cross-member, said means associated with said boom arm comprising a set of lugs permanently secured to said inner and outer plates, each lug of each set positioned to each side of said opening and lying generally in the same plane, said fastener means comprising a wedge for each pair of slots, each wedge is driven into the slot pairs where spatial relationship of the slots to the lugs is such that said wedges abut corresponding lugs to resist thereby on said inner and outer plates said forces exerted on the interconnection.

9. In a power loader of claim 1, said means associated with said cross-member end portion comprises a metal pad through which said cross-member extends and to which said cross-member is permanently secured, said pad having spaced-apart planar edges, said cross-member end portion extending through aligned apertures in said inner and outer plates with said metal pad abutting said inner plate, said cross-member end portion having an external thread onto which a nut is threaded to connect said cross-member to said boom member, a pair of spaced-apart lugs secured to said inner plate about said aperture and positioned to abut corresponding planar edges of said pad to resist said torsional forces.

10. In a power loader of claim 1, said transfer means including an extension of said cross-member which extends through aligned apertures in said inner and outer plates.

11. In a power loader of claim 10, said means associated with said boom member comprising said apertures which snugly receive said cross-member extension to resist said shear forces.

12. In a power loader of claim 1, said means associated with said cross-member end portion comprises a metal pad of irregular outline which abuts said inner plate, said means associated with said boom member comprises lug portions which capture said irregular pad outline when coupled.

13. In a power loader of claim 12, said pad being triangular shaped.

14. In a power loader of claim 12, said pad is pentagonal shaped.

15. In a power loader of claim 1, said means associated with said boom member comprising a first metal pad secured to said inner plate, said means associated with said cross-member end portions comprising a second metal pad secured to the ends of said cross-member, said first and second pads having mating interfitting surfaces to resist said shear force, said fastener means coupling the cooperating means to resist said torsional forces and forces along said cross-member, said transfer means comprising a rigid member secured to said first pad, extending through apertures in said inner and outer plates and secured to said outer plate.

16. In a power loader of claim 15, said first pad having a plurality of threaded studs extending outwardly thereof, said second pad having a corresponding plurality of apertures aligned in register with said studs, each said aperture having a countersunk portion to receive a tapered portion in a nut for each stud, said nut and aperture countersunk portion cooperating to centre said first and second pads as coupled to resist by said studs said torsional and shear forces and forces along said cross-member.

17. In a power loader of claim 15, said first pad having a plurality of threaded bores and said second pad having a plurality of aligned apertures, said fastener means thereby including a corresponding plurality of bolts extending through the aperture of said second pad and threaded into said bores of said first pad to couple the pads together 18. In a power loader of claim 17, said first pad having a circular projection and said second pad having a corresponding recess to snugly receive said circular projection in forming said mating interfit.

19. In a power loader of claim 17, said first pad having a recessed channel portion and said second pad having a corresponding U-shaped projection for forming a mating interfit with said channel portion when coupled by said fastener means.

* * * * *